May 8, 1962 G. M. PURDY 3,033,253
TREE SAW
Filed Sept. 28, 1959 3 Sheets-Sheet 1
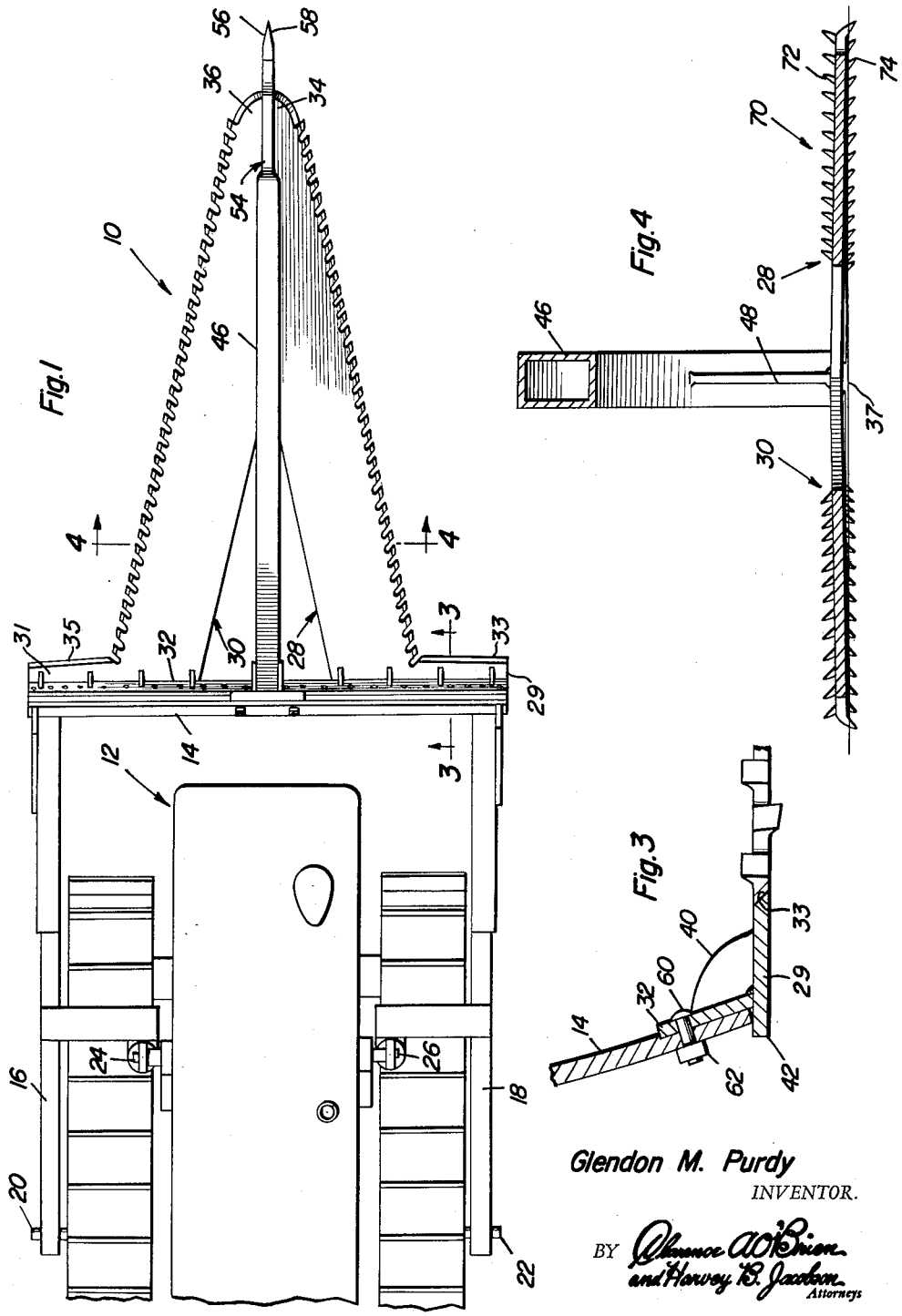
Glendon M. Purdy
INVENTOR.

May 8, 1962    G. M. PURDY    3,033,253
TREE SAW
Filed Sept. 28, 1959    3 Sheets-Sheet 2
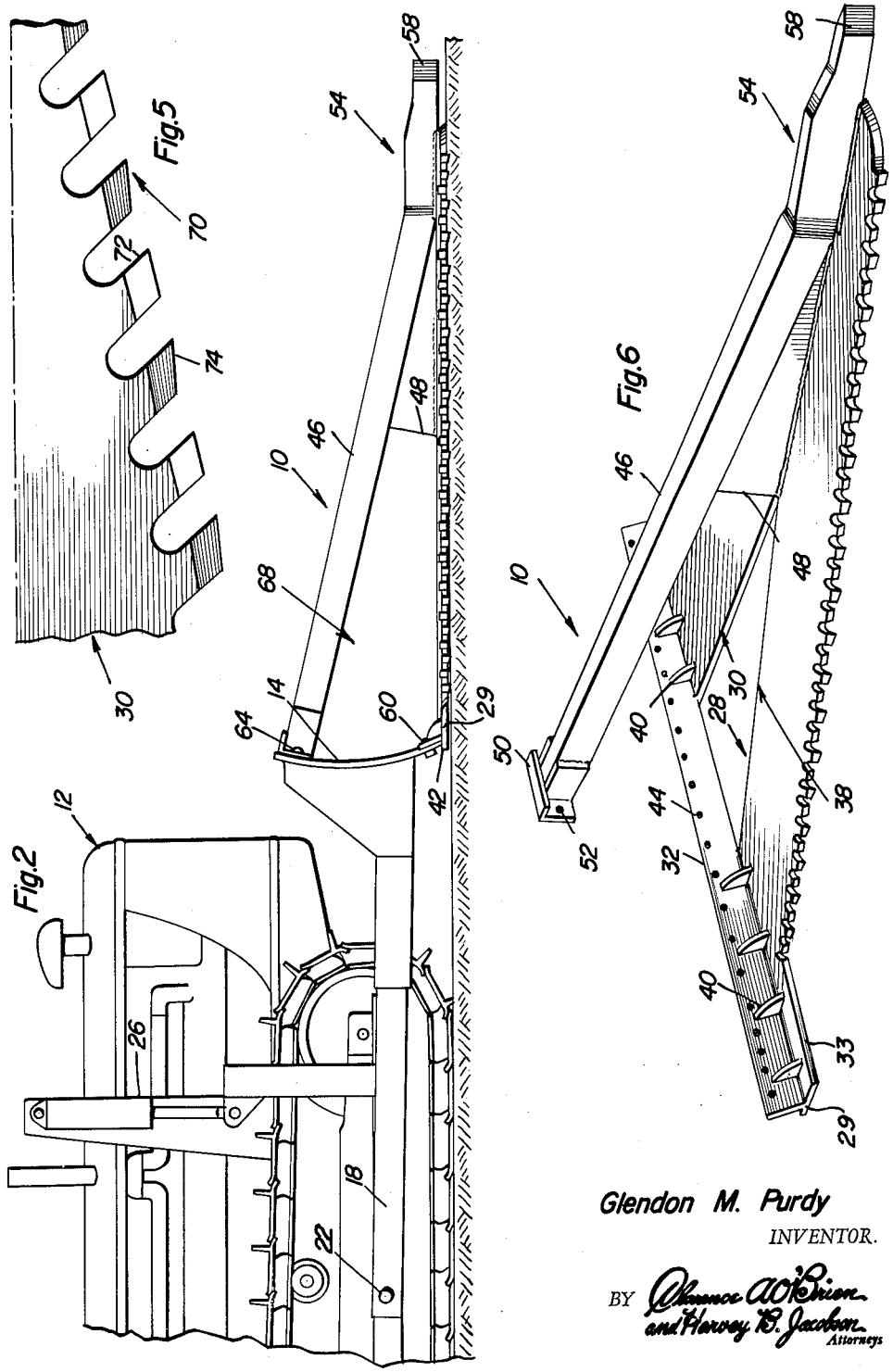
Glendon M. Purdy
INVENTOR.

May 8, 1962 G. M. PURDY 3,033,253
TREE SAW
Filed Sept. 28, 1959 3 Sheets-Sheet 3
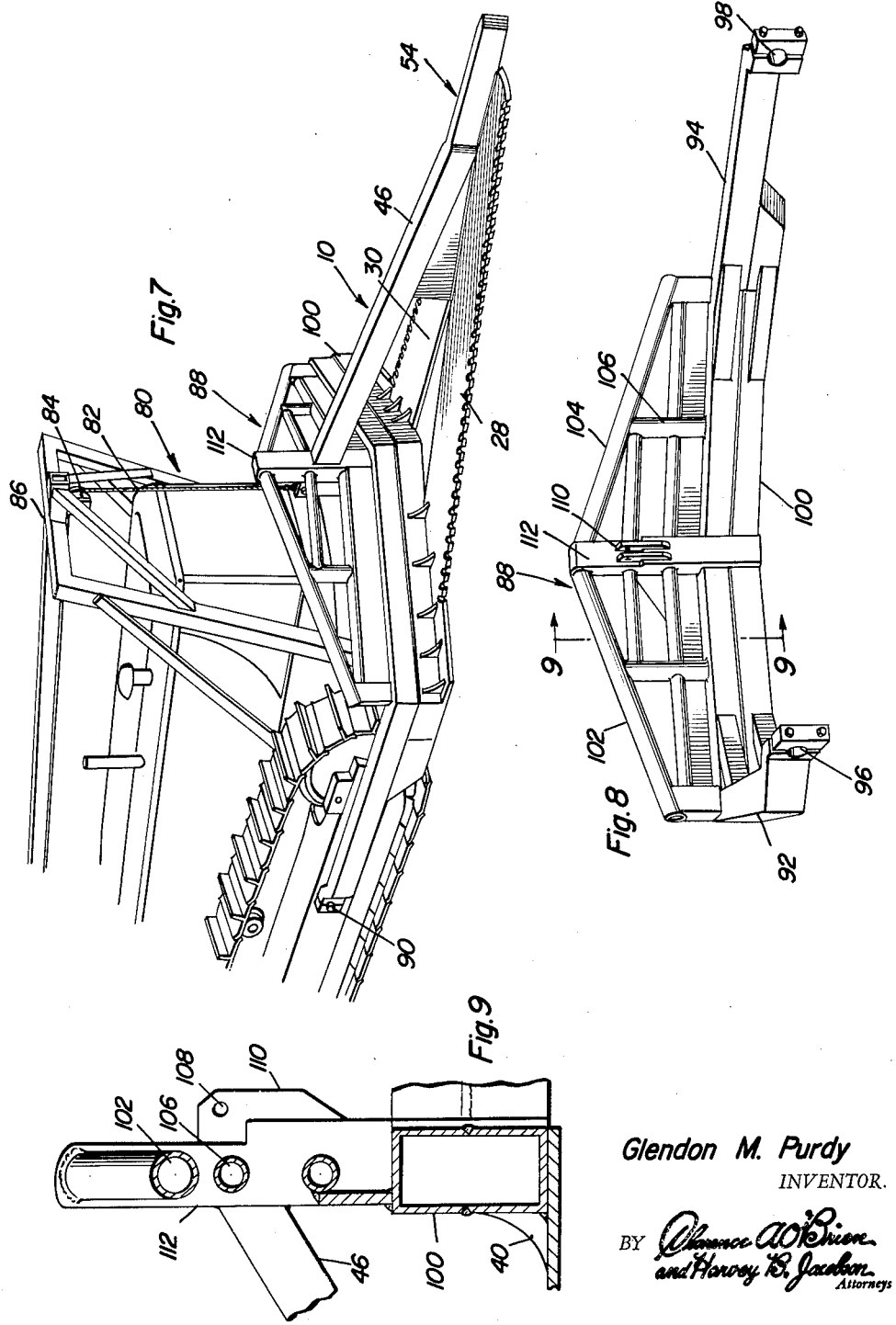
Glendon M. Purdy
INVENTOR.

United States Patent Office 3,033,253
Patented May 8, 1962

3,033,253
TREE SAW
Glendon M. Purdy, 105 Beech St., McGehee, Ark.
Filed Sept. 28, 1959, Ser. No. 842,961
3 Claims. (Cl. 144—34)

This invention relates generally to an implement to be utilized for cutting tree stumps and more particularly to an implement specifically adapted for sawing stumps which have been submerged for a period of years as in fish farms.

Much land is presently being utilized for the purpose of fish farming along the Mississippi River in the area of the rice fields. Generally, the fish are a rooter type that root the ground and eat small underwater plant roots and moss. Roots are kept in the rice fields in 2 to 4 feet of water during the time that the rice land is being utilized for fish farming. Generally, the rice land is utilized for fish farming during three year periods, the time it takes to grow the fish into a size at which they can be sold. A significant problem that develops in the rotation of the land crop between fish and rice, is that the rooter type or buffalo fish root the dirt from around the stump while eating the moss roots that grow on the submerged stump. Although the stump may be cut with conventional equipment level with the ground, after the land has been utilized to farm one crop of fish, the stump will be exposed about 3 to 6 inches in a slight depression where the fish have rooted back the top soil. This then, makes the ground unsuitable for the planting of rice and makes it an ideal time to cut the stump well below the ground to where it will be of no further bother.

In view of the above, it is the principal purpose of this invention to provide a tree saw adaptable to be fastened to the front of crawler type tractors or bull-dozers with the saw running below the surface of the ground for the purpose of engaging the roots and stumps to cut into the stump.

A further object of the invention is to provide a tree saw which includes a sharp splitter on the forward end thereof extending approximately one foot in front of the nose of the saw cutting edge. After the cutting edge of the saw has penetrated the tree on a first pass of the tractor or bull-dozer, the splitter may be guided by the operator to split off that portion of the stump which has been gashed and on the same pass may continue forward and make another gash on deeper into the remaining portion of the stump. Then, again, the splitter may be utilized to split off the second gashed portion until the entire stump is cut into small chunks. Further, it will be realized that by breaking the stumps into small chunks as described, there is no need to utilize a great deal of manual labor to remove the stumps from the field.

It is a still further object of the invention to provide a tree saw including two flat blades which are fixed at their rear ends to a transverse support member. The flat blades converge at the forward portion thereof with the outer edges of the blades having cutting teeth formed thereon. A horizontal opening is defined between the converging blades adjacent the transverse support member and a vertical opening is defined between the blades and a rearwardly inclined support member extending between the forward portion of the blade and the tractor or bull-dozer. The horizontal and vertical openings adapt the tree saw to shed dirt which is of necessity loosened when cutting the stump beneath the ground. A plurality of tree cutters have been developed and are on the market today which operate on the principle of a giant plow, plowing great mounds of earth out to the side even when only cutting very slightly beneath the ground. The conventional cutters collect great quantities of dirt on the blades and hinder the operation thereof. Therefore, one of the most significant features of the invention is the provision of the horizontal and vertical openings which enables the operator of the tractor or bull-dozer, after the stump has been cut, to raise his tree saw so that the dirt will pour through the openings and back into the stump hole, thus eliminating the mound of dirt which is costly to spread and float into proper position for planting rice. The blades utilized consist of two thin flat sheets of metal that are inclined toward the longitudinal axis defined therebetween. The slight incline enables the blades to be submerged into the earth as the tree saw is lowered and the tractor moves forward. The dirt adjacent the stump is pushed to the rear by the stump and roots and rides immediately on the flat surface of the blades. Then, by merely lifting the blade when over the desired position, after the stump is cut, the collected dirt will pour through the openings into the stump hole. It is significant to note that the blade has no wall or surrounding upright obstacle to trap the dirt.

It is a still further object of this invention to provide a tree saw which may be utilized to cut large trees and surrounding brush. The tree saw has been constructed with teeth of such a configuration that a very small opening is defined between the teeth so that it may cut the smallest of bushes and the largest of trees.

It is a still further object of this invention to provide a novel tree saw construction which is relatively inexpensive to manufacture and easy to utilize.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational plan view of a crawler-type tractor or bull-dozer illustrating the tree saw mounted on the front end thereof;

FIGURE 2 is an elevational side view of the bull-dozer and tree saw showing how the saw may be secured to the bull-dozer blade;

FIGURE 3 (sheet 1) is an enlarged fragmentary sectional view taken substantially along the plane 3—3 of FIGURE 1 illustrating how the transverse support member of the tree saw may be secured to the bull-dozer blade;

FIGURE 4 is a vertical sectional view taken substantially along the plane 4—4 of FIGURE 1;

FIGURE 5 is an enlarged elevational plan view of a portion of an edge of one of the blades showing particularly the arrangement of the teeth utilized;

FIGURE 6 is a perspective view of the tree saw detached from the bull-dozer;

FIGURE 7 is a perspective view of an older type of bull-dozer illustrating how the tree saw may be secured to a separate frame pivoted to the bull-dozer;

FIGURE 8 is a perspective view of the rear portion of the separate frame which is adapted to be pivotally supported on the dozer; and FIGURE 9 is an enlarged vertical sectional view taken substantially along the plane 9—9 of FIGURE 8.

With continuing reference to the drawings, and initial reference to FIGURES 1 and 2, it will be noted that the tree saw comprising this invention generally designated as 10 is adapted to be secured to a conventional bull-dozer 12. The bull-dozer 12 illustrated in FIGURES 1 and 2 has a dozer blade 14 carried by arms 16 and 18 which are pivotally mounted on spindles 20 and 22. Hydraulic cylinders 24 and 26 are connected to the arms 16 and 18 for enabling the operator of the bull-dozer 12 to lift the dozer blade as desired.

The tree saw 10 includes a generally V-shaped, horizontal cutter comprising two flat thin pieces of metal or blades indicated by the numerals 28 and 30. On the rear end portions thereof the blades 28 and 29 comprise, respectively, integral outwardly laterally extending wings 29 and 31 having beveled cutting edges 33 and 35, respectively. The rear portion of the blades 28 and 30 are secured to a transverse bar or support member 32, as by welding. The blades 28 and 30 are spaced along the transverse support member 32 and converge toward the nose or forward portion generally designated as 34 and 36. As will be clearly seen in FIGURE 1 and 6, the blades 28 and 30 define a substantially horizontally disposed opening generally designated as 38 therebetween.

Brace means as at 40 (FIGURE 3) are secured between the transverse support member 32 and the blades 28 and 30 for rigidifying the construction. A rearwardly extending flange 42 is provided beneath and behind the transverse support member 32. Also, a series of apertures 44 (FIGURE 6) are provided along the length of the transverse support member for purposes to be more particularly described below.

A rearwardly inclined brace or support member 46 extends from the nose or forward portions 34 and 36 of the blades 28 and 30. A wall 48 extends rearwardly from the forward portions of the blades beneath the rearwardly inclined support member 46 for bracing the support member. An angle plate 50 is rigidly secured to the support member 46 on the rear end thereof. The angle plate 50 defines openings 52 therein.

Carried at the forward end of the support member 46 above the blades 28 and 30 and fixed thereon, is a forwardly projecting splitter element or wedge 54 having flat vertical forwardly converging surfaces 56 and 58. In order to secure the tree saw 10 to the bull-dozer 12, it is contemplated that the dozer blade 14 be rested on the rearwardly extending projection 42 as is particularly illustrated in FIGURE 2. Thereafter, bolts 60 (FIGURE 3) are received through the transverse support member 32 and through the dozer blade 14 and receive nuts 62 thereon. The apertures 44 defined in the transverse support member 32 are aligned with apertures formed in the dozer blade 14. Likewise, bolts 64 (FIGURE 2) extend through the apertures 52 in the angle plates 50 carried by the support member 46 for securing the tree saw to the dozer blade 14. It will be noted that a vertical opening generally designated as 68 is defined between the rearwardly inclined support member 46 and the blades 28 and 30.

Particular attention is now drawn to FIGURE 4 wherein it is to be noted that the blades 28 and 30 are inclined slightly toward a longitudinal axis defined therebetween as will be seen from a comparison with the horizontal line 37, the longitudinal axis being aligned with the rearwardly inclined supporting member 46. By inclining the blades as indicated, the outer cutting edges of the blades are able to penetrate beneath the ground surface in order to cut the stump inches below the soil.

The cutting teeth 70 are disposed on the outer edges of both of the blades 28 and 30. It is to be noted that the teeth alternately extend upwardly and downwardly as respectively indicated by the numerals 72 and 74 in FIGURE 4. Moreover, attention is particularly drawn to FIGURES 5 and 6 wherein it is to be further noted that the outer surfaces of the individual teeth are respectively alternately inclined toward and away from the longitudinal axis defined between the blades 28 and 30. In the normal utilization of the tree saw illustrated in FIGURES 1 through 6, the operator of the dozer will move the saw along the ground, with the saw slightly inclined toward the rear; that is, the nose or forward portions 34 and 36, and splitting element 54 are to be at a lower elevation than the rear portions or transverse supporting bar 32. Therefore, the operator will initially pass a stump with the teeth on either of the saw blades 28 or 30 gashing the stump beneath the ground surface. Then, the operator of the dozer may make another pass and by engaging the splitting element 54 with the gashed stump portion, chip off a chunk of the stump and at the same time make a further gash. By proceeding in this manner with the blades carried as suggested and with the teeth arranged as indicated, the stump may be cut beneath the ground surface. Moreover, inasmuch as the blades are cutting beneath the ground, dirt will gather on the flat blade surfaces. However, since the openings 38 and 68 are provided as indicated, the collected dirt will continually fall through and any gathered dirt will completely fall off when the operator of the dozer lifts the blade. Therefore, it will be seen that no undesirable holes will be left in the ground after the stump is removed. The wings 29 and 31 cut underbrush to the width of the tractor when traveling therethrough.

Attention is now drawn to FIGURES 7 through 9 wherein a different form of mounting means for the tree saw 10 is suggested. The dozer illustrated in FIGURE 7 is generally designated by the numeral 80 and is of an older type than the dozer designated by the numeral 12. In lieu of the hydraulic means utilized in connection with the dozer 12, a cable 82 is utilized about the pulley 84 secured to the frame 86, for lifting a frame generally designated as 88 about pivotal connections 90, preferably of the ball and socket type. The frame 88 includes a pair of rearwardly extending arms 92 and 94 having socket portions 96 and 98 for rotatably receiving balls forming a part of the dozer 80. The arms 92 and 94 are secured to a transverse frame portion including a lower bar 100, and upper inclined bars 102 and 104. Various brace elements 106 are provided between the upper and lower bars for lending rigidity to the structure. The cable 82 is adapted to pass through openings 108 formed in the projects 110 on the inner side of the frame 88. The tree saw 10 is secured on the forward face of the frame 88 in a manner similar to that suggested in FIGURES 1 through 6. However, instead of utilizing the bolts 60 and 64 to secure the tree saw 10 to the blade 14, the tree saw 10, is welded to the lower bar 100 and central bar 112 as indicated in FIGURE 7. Of course, it will be appreciated that the tree saw 10 mounted as illustrataed in FIGURE 7, is utilized in the manner above suggested for the tree saw illustrated in FIGURES 1 through 6.

From the foregoing, it should be appreciated that a novel tree saw construction has been described enabling stumps beneath the ground to be efficiently removed with a minimum of trouble. The inclusion of the openings 38 and 68 particularly enable the tree saw to cut out a stump with a minimum of passes inasmuch as dirt is prevented from gathering on the saw and hindering the operation thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A device for sawing trees comprising a pair of flat blades converging at the forward portions thereof and defining a horizontal opening therebetween, said blades provided with teeth on the outer edges thereof, and a rearwardly and upwardly inclined support member secured to said blades at said forward portions defining a vertical opening between said inclined support member and said blades, and a transverse support member secured to the rear portion of said blades remote from said forward portions, each of said flat blades defining a surface plane and a longitudinal axis therebetween, each of said surface planes being similarly slightly inclined upwardly toward said longitudinal axis, and a splitting wedge secured to said inclined support member adjacent said forward portions and projecting forwardly therebeyond said splitting wedge including a pair of converging flat vertical surfaces.

2. A device as in claim 1 including outwardly laterally extending brush-cutting wings on the rear end portion of said saw blades, said transverse support member bridging and traversing the blades and the wings.

3. A tree saw attachment for a bulldozer blade comprising a generally V-shaped horizontal cutter including a pair of rearwardly divergent toothed saw blades, and means on the rear end portion of the cutter for securing same on a bulldozer blade, said saw blades including outwardly laterally extending brush-cutting wings on their rear end portions, said means including an apertured, transverse bar bridging and traversing the blades and the wings adjacent to but forwardly of the rear edges thereof for attachment to the front of the bulldozer blade with said saw blades and wings engaged therebeneath.

References Cited in the file of this patent

UNITED STATES PATENTS

| | | |
|---|---|---|
| 927,612 | Stevens | July 13, 1909 |
| 1,336,209 | Driver | Apr. 6, 1920 |
| 1,346,382 | Pomije | July 13, 1920 |
| 1,894,516 | Karstadt | Jan. 17, 1933 |
| 2,309,223 | Staring | Jan. 26, 1943 |
| 2,336,124 | Phoenix | Dec. 7, 1943 |
| 2,396,407 | Austin | Mar. 12, 1946 |
| 2,512,666 | Meske | June 27, 1950 |
| 2,633,880 | Mattson | Apr. 7, 1953 |
| 2,770,267 | Edmiston | Nov. 13, 1956 |
| 2,821,217 | Shald | Jan. 28, 1958 |
| 2,934,109 | Bles | Apr. 26, 1960 |
| 3,004,570 | Clayton et al. | Oct. 17, 1961 |